United States Patent
Ogita et al.

(10) Patent No.: US 9,013,613 B2
(45) Date of Patent: Apr. 21, 2015

(54) SENSOR-EQUIPPED DISPLAY APPARATUS AND ELECTRONIC APPARATUS

(75) Inventors: Takeshi Ogita, Tokyo (JP); Shin Takanashi, Kanagawa (JP); Susumu Takatsuka, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 603 days.

(21) Appl. No.: 13/114,277

(22) Filed: May 24, 2011

(65) Prior Publication Data

US 2012/0069042 A1   Mar. 22, 2012

Related U.S. Application Data

(60) Provisional application No. 61/384,964, filed on Sep. 21, 2010.

(51) Int. Cl.
*H04N 5/222* (2006.01)
*H04M 1/02* (2006.01)
*H04N 7/14* (2006.01)

(52) U.S. Cl.
CPC .......... *H04M 1/0264* (2013.01); *H04M 1/0266* (2013.01); *H04M 2250/12* (2013.01); *H04N 7/144* (2013.01)

(58) Field of Classification Search
CPC .......... H04N 5/222; H04N 7/14; G06K 9/00; G09G 5/00; G09G 5/02
USPC .......... 348/333.01, 333.02, 14.01; 345/589, 345/581, 582, 583, 597, 599; 382/167, 162; 455/556.1, 556.2, 557
See application file for complete search history.

(56) References Cited

U.S. PATENT DOCUMENTS

| | | | | |
|---|---|---|---|---|
| 6,166,790 | A * | 12/2000 | Kameyama et al. | 349/96 |
| 2006/0227267 | A1* | 10/2006 | Ikadai et al. | 349/114 |
| 2007/0120879 | A1* | 5/2007 | Kanade et al. | 346/107.2 |
| 2008/0298571 | A1* | 12/2008 | Kurtz et al. | 379/156 |
| 2010/0238314 | A1* | 9/2010 | Fredlund et al. | 348/222.1 |
| 2010/0238341 | A1* | 9/2010 | Manico | 348/333.01 |
| 2010/0296027 | A1* | 11/2010 | Matsuhira et al. | 349/96 |
| 2010/0304787 | A1* | 12/2010 | Lee et al. | 455/556.1 |

FOREIGN PATENT DOCUMENTS

| | | |
|---|---|---|
| CN | 101488301 A | 7/2009 |
| CN | 101523275 A | 9/2009 |
| CN | 101535890 A | 9/2009 |
| CN | 101557430 A | 10/2009 |
| CN | 101650593 A | 2/2010 |

(Continued)

OTHER PUBLICATIONS

Extended European Search Report issued Dec. 9, 2011 in patent application No. 11172545.3.

(Continued)

*Primary Examiner* — Tuan Ho
(74) *Attorney, Agent, or Firm* — Oblon, McClelland, Maier & Neustadt, L.L.P.

(57) ABSTRACT

A sensor-equipped display apparatus including a light-transmissive display screen, a sensor that detects light passing through the light-transmissive display screen, and a material that visually obscures the sensor when viewed through the light-transmissive display screen.

16 Claims, 13 Drawing Sheets

(56) References Cited

FOREIGN PATENT DOCUMENTS

| JP | 2007-201823 | 8/2007 |
| WO | WO 2007/047685 A2 | 4/2007 |
| WO | WO 2007/047685 A3 | 4/2007 |
| WO | WO 2008/047785 A1 | 4/2008 |

OTHER PUBLICATIONS

Combined Chinese Office Action and Search Report issued Sep. 3, 2013 in Patent Application No. 201110209383.X (with English language translation).

* cited by examiner

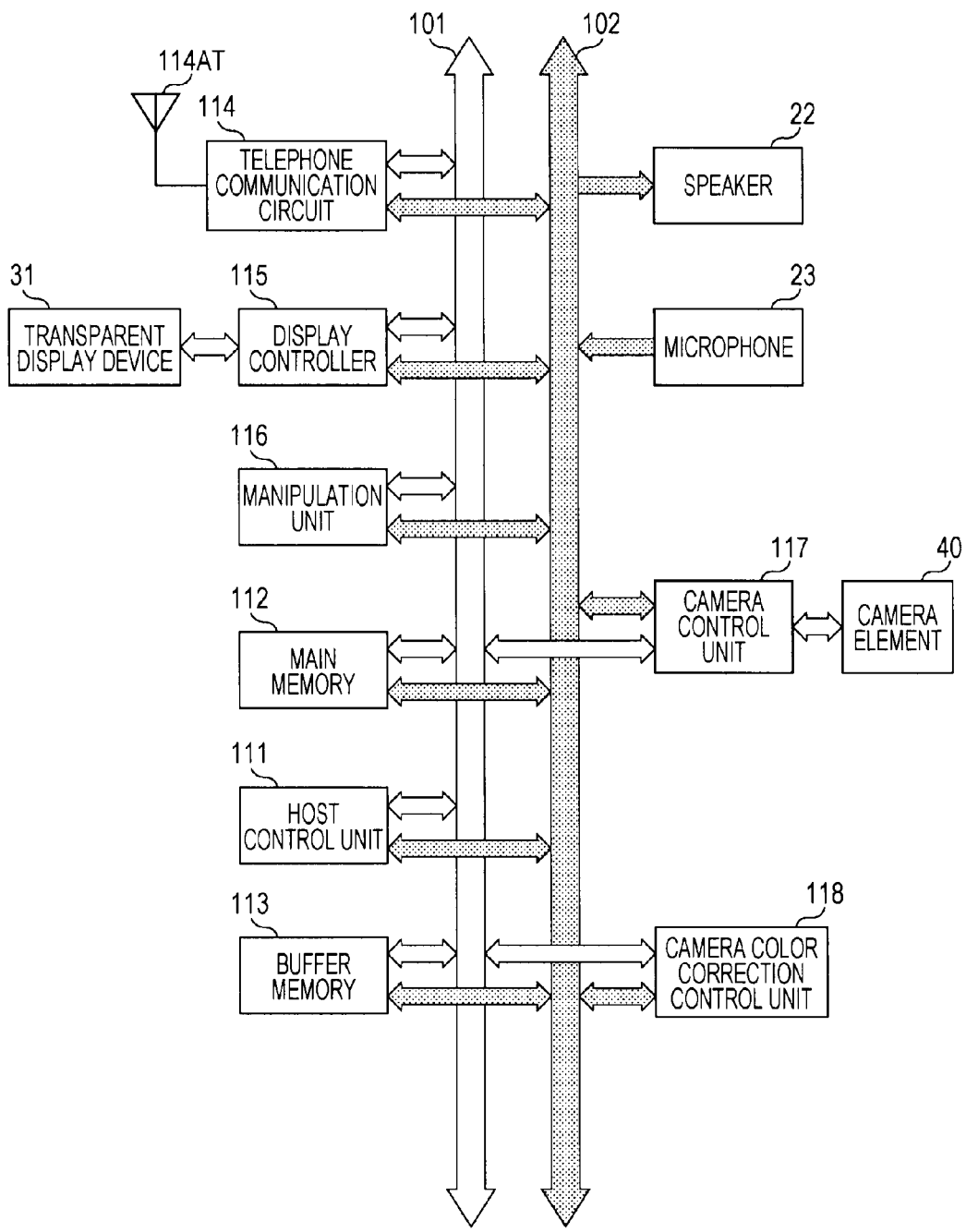

SENSOR-EQUIPPED DISPLAY APPARATUS AND ELECTRONIC APPARATUS

CROSS REFERENCE TO RELATED APPLICATION

The present application claims the benefit of the earlier filing date of U.S. Provisional Patent Application Ser. No. 61/384,964 filed on Sep. 21, 2010, the entire contents of which is incorporated herein by reference.

BACKGROUND OF THE DISCLOSURE

1. Field of the Disclosure

The present disclosure relates to a display apparatus having a sensor such as a camera element or a light quantity sensor and an electronic apparatus having the same.

2. Description of the Related Art

Camera-equipped mobile phone terminals are being widely used, and mobile phone terminals having a so-called video phone function are also used (for example, refer to Japanese Unexamined Patent Application Publication No. 2007-201823). FIGS. 14A and 14B illustrate the appearance of an exemplary mobile phone terminal having a video phone function. FIGS. 14A and 14B show the case of a foldable mobile phone terminal 10, in which the upper and lower casings 11 and 12 are openably assembled about the rotation hinge portion 13.

FIG. 14A is a side view illustrating a state where the mobile phone terminal 10 of this example is opened at a predetermined angle. In addition, FIG. 14B illustrates the inner face 11a side of the upper casing 11 viewed in the direction of the arrow AR1 of FIG. 14A.

As shown in FIGS. 14A and 14B, the mobile phone terminal 10 of this example is provided such that the display screen 14 of the display device is exposed in the inner face 11a of the upper casing 11, and the internal camera element 15 capable of taking a shot of the user of the mobile phone terminal 10 looking at the display screen is provided in a separate area from the display screen 14. The internal camera element 15 includes a camera element having a lens and an image sensor.

The inner face 12a of the lower casing 12 is provided with a key manipulation unit 16 having a numerical key pad, an arrow cursor key, or the like. Furthermore, the outer face 12b of the lower casing 12 is provided with an external camera 17. The external camera 17 also includes a camera element having a lens and an image sensor.

In addition, the proximity of the upper end of the inner face 11a of the upper casing 11 is provided with a speaker 18 for emitting sound of the received voice during a call.

A user can execute communication using a video phone while seeing the display screen 14 from the direction of the arrow AR1 by activating a video phone function with the mobile phone terminal 10 being opened as shown in FIG. 14A. In this case, an image of a user captured by using the internal camera element 15 is transmitted to the counterpart device.

FIG. 15A illustrates the positional relationship among the display screen 14, the internal camera element 15, and a user 1 when the video phone is used, and FIG. 15B illustrates a captured image of the user 1 obtained by the internal camera element 15 based on such a positional relationship.

As shown in FIG. 15A, since the user 1 looks at the image of the counterpart displayed on the display screen 14 when video phone communication is executed, the gaze direction thereof is directed to the display screen 14 as shown in an arrow AR2. Therefore, the direction of the gaze direction of a user 1 is different from the camera shot direction of the internal camera element 15 shown in an arrow AR3.

As a result, the captured image of a user 1 becomes a non-front image, in which the gaze direction is not directed to the counterpart, as shown in FIG. 15B, so as to be an image which creates unease a user communicating using the video phone.

In addition, the mobile phone terminal 10 also has a function of adjusting the luminance of the display screen 14 in response to the brightness of the environment where the display screen 14 is used. In this case, the mobile phone terminal 10 is provided with an illuminance sensor 19 for detecting illuminance based on the intensity of the incident light or the light quantity in a separate area from the display screen 14 of the inner face of the upper casing 11 as shown in FIG. 16. The mobile phone terminal 10 adjusts the luminance of the display screen 14 to allow a user to easily see it in response to the illuminance detected by the illuminance sensor 19. For example, when the environment where the display screen 14 is used is relatively dark, the luminance of the display screen 14 is adjusted to be relatively darker. When the environment where the display screen 14 is used is bright, the luminance of the display screen 14 is adjusted to be brighter.

However, in the mobile phone terminal 10 of the related art, since the illuminance sensor 19 is provided in a separate area from the display screen 14 as described above, the illuminance detected by the illuminance sensor 19 is not the illuminance for the light incident on the display screen 14. For this reason, the luminance may not be optimally adjusted when the user sees the display screen 14.

For example, FIG. 17 shows an exemplary positional relationship among the sun 2, the display screen 14, the illuminance sensor 19, and a user 1 when the mobile phone terminal 10 is used in an outdoor environment. In the case of the positional relationship between the sun 2 and the user 1 as an example shown in FIG. 17, although the display screen 14 is shaded by the shadow of a user 1, the illuminance sensor 19 recognizes it as being bright without being shaded by the shadow of a user 1. For this reason, while the illuminance detected by the illuminance sensor 19 different from that of the display screen 14, the luminance of the display screen 14 is adjusted based on the illuminance detected by the illuminance sensor 19. Therefore, it may fail to provide an optimal display screen luminance to a user 1.

SUMMARY

As described above, the sensors such as the camera element 15 or the illuminance sensor 19 is necessary to be provided on the same face as that of the display screen 14 considering its application. In addition, in a mobile phone terminal of the related art, while a sensor such as the camera element 15 or the illuminance sensor 19 is provided on the same face as that of the display screen 14, the sensor is provided in a separate area from the display screen 14. For this reason, it is necessary to prepare an area of the display screen 14 of the display device in a separate area from the sensor arrangement area, and thus, disadvantageously, the size of the display screen is reduced that much.

In addition, as described above, in the case where a shot is taken of a user who looks at the display screen by providing the camera element on the same face as that of the display screen, in the related art, since the camera element is provided in a separate area from the display screen, the gaze direction of a user is not directed to the camera shot direction. For this reason, the transmission image of the video phone does not become a front image in which the gaze direction is directed to the counterpart and creates an uneasy feeling in a user who communicates using the video phone.

Furthermore, in the related art, since the illuminance sensor for correcting the luminance of the display screen is provided in a separate area from the display screen, it is difficult to optimally adjust the luminance correction of the display screen.

It is desirable to provide a sensor-equipped display apparatus capable of addressing the aforementioned problems.

According to an embodiment of the present disclosure, there is provided a sensor-equipped display apparatus including a light-transmissive display screen, a sensor that detects light passing through the light-transmissive display screen, and a material that visually obscures the sensor when viewed through the light-transmissive display screen.

According to the embodiment of the disclosure, the sensor is provided on the back surface of the display screen. Therefore, an area for separately providing the sensor is not necessary on the surface where the display screen is provided, so that it is possible to increase the size of the display screen.

In the case where the camera element is used as the sensor, the gaze direction of a user who looks at the display screen is directed to the camera shot direction. Therefore, it is possible to obtain a front image for a user from the camera element.

In the case where an optical sensor such as the illuminance sensor is used as the sensor, it is possible to detect the light transmitting through a portion as the display screen. Therefore, it is possible to perform optimal correction such as the case where the luminance of the display screen is corrected using the output of the illuminance sensor.

According to the present disclosure, since the sensor is provided on the back surface of the display screen, it is possible to increase the size of the display screen. Since the incident light through the display screen is received by the sensor, it is possible to obtain effects not being obtained in the related art. For example, when the sensor is a camera element, it is possible to obtain a front image for a user from the camera element. In addition, in the case where the luminance of the display screen is adjusted using the output from the illuminance sensor as an example of the sensor, it is possible to perform optimal adjustment.

BRIEF DESCRIPTION OF THE DRAWINGS

FIG. 4 is a block diagram illustrating an exemplary hardware structure of an internal circuit of the electronic apparatus according to a first embodiment of the disclosure;

DESCRIPTION OF THE PREFERRED EMBODIMENTS

Hereinafter, a sensor-equipped display apparatus and an electronic apparatus having the same according to an embodiment of the disclosure will be described with reference to the accompanying drawings.

First Embodiment

Figure 1:
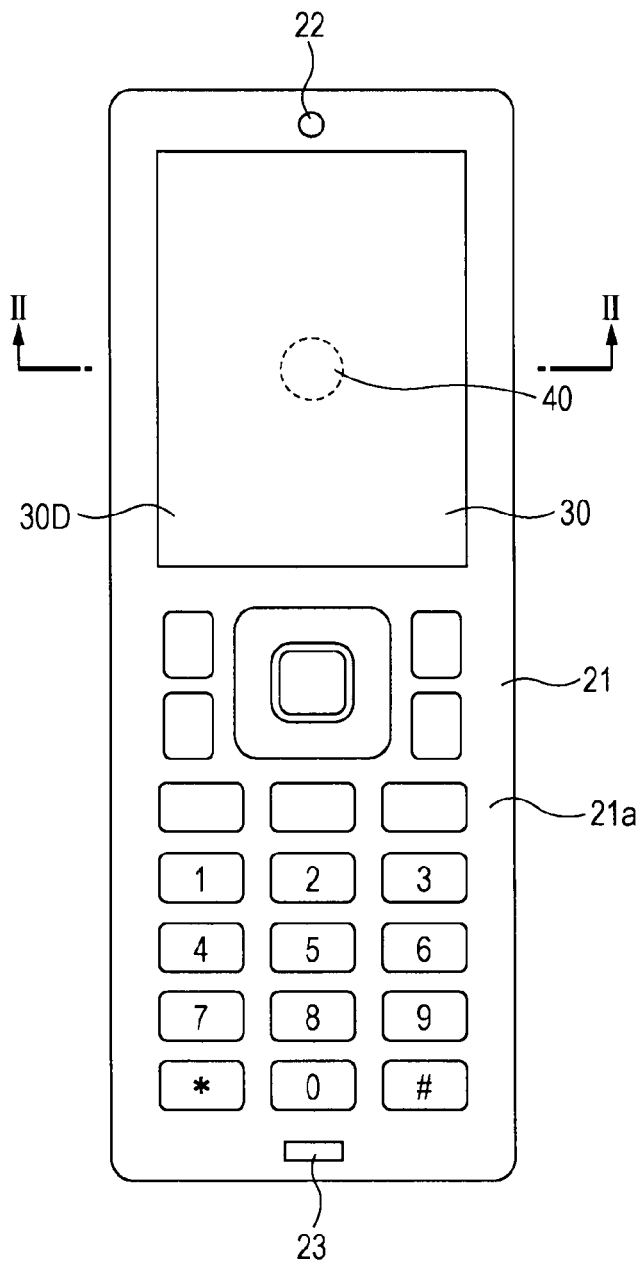
FIG. 1 illustrates an exemplary appearance of an electronic apparatus according to a first embodiment of the disclosure.

FIG. 1 is a front view illustrating a mobile phone terminal 20 as an exemplary electronic apparatus having the sensor-equipped display apparatus according to a first embodiment of the disclosure. The mobile phone terminal 20 of an example of FIG. 1 is a so-called straight type mobile phone terminal and has a thin and substantially rectangular casing 21. A display screen 30D of the display unit 30 corresponding to the sensor-equipped display apparatus according to an embodiment of the disclosure is formed on a plane 21a in one side of the casing 21.

In addition, in the present embodiment, the camera element 40 is provided on the back face of the display unit 30, as a sensor for sensing the incident light transmitted through the display screen 30D. In this example, the camera element 40 is located in nearly the center of the display screen 30D of the display unit 30. The mobile phone terminal 20 of the present embodiment has a video phone function so that the image of a user captured by the camera element 40 becomes the transmission image of the video phone.

In the present example, a speaker 22 for emitting a received voice during a call is provided in the upper side of the display screen 30D as an area separate from the display screen 30D of the plane 21a of the casing 21. In addition, a manipulation button group and a microphone 23 for collecting a transmitted voice during a call are provided in the lower side of the display screen 30D in the plane 21a of the casing 21.

Figure 2:
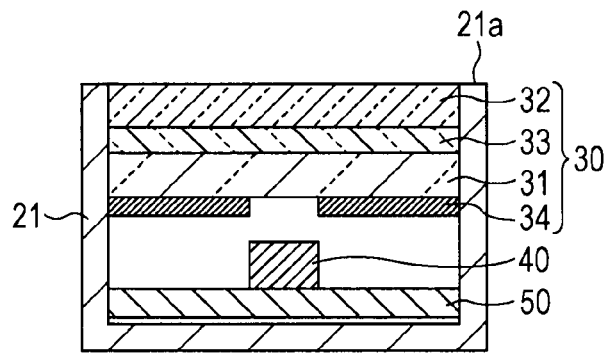
FIG. 2 is a cross-sectional view taken along the line II-II of FIG. 1.

FIG. 2 is a cross-sectional view illustrating the mobile phone terminal 20 taken along the line II-II of FIG. 1. In the present embodiment, the display device of the display unit 30 includes a transparent display device 31. The transparent display device 31 includes a transparent organic electroluminescence (EL) panel in the present example.

Since, as such a transparent organic EL panel, which is disclosed in, for example, Japanese Unexamined Patent Application Publication No. 2002-296375 may be used, detailed descriptions thereof are not repeated. However, the hole-injection layer/organic electroluminescent layer (EL layer) is interposed between two transparent electrodes. In this example, in the transparent display device 31, the hole-injection layer/organic electroluminescent layer (EL layer) is divided by a bank into a red electroluminescent layer, a green electroluminescent layer, and a blue electroluminescent layer to provide a structure capable of executing color display.

In addition, in the display unit 30, a bonding sheet 33 is adhered on the surface 31a side (front surface side) of the transparent display device 31. A transparent plate 32 is provided on this bonding sheet. The transparent plate 32 is a transparent member made of plastic or glass or the like.

The bonding sheet 33 is made of, for example, a transparent tape or transparent resin cured by ultraviolet rays. The refractive index of this bonding sheet 33 is preferably approximate to the refractive indices of the transparent display device 31 and the light guide plate. If this bonding sheet 31 does not exist, an air layer is present between the transparent display 31 and the transparent plate 32. As a result, the refractive index of the transparent plate 31 is larger than the refractive index of the air (the refractive index of the transparent plate 31>the refractive index of the air) so that a critical angle is generated. Therefore, for example, in the case where the mobile phone terminal 20 is used in an outdoor environment, when the external light is strong, reflection occurs in the transparent plate 32, so that it is difficult to recognize the display contents on the transparent display device 31.

In this embodiment, generation of the critical angle is prevented, and difficulty in recognizing the display contents on the transparent display device 31 is avoided by providing the bonding sheet 33 having a refractive index approximate to that of the transparent display device 31 between the transparent display device 31 and the transparent plate 32.

In addition, the bonding sheet 33 is used to bond between the transparent display device 31 and the transparent plate 32 in order not to generate the air layer as much as possible. The bonding sheet 33 is not indispensable and may be omitted.

The camera element 40 includes a lens and a charge coupled device (CCD) image sensor or a complementary metal oxide semiconductor (CMOS) image sensor. The camera element 40 is provided on the substrate 50 in a state where the lens side faces the opposite side surface (the back surface) to the surface 31a of the transparent display device 31 to receive the light transmitted through the transparent display device 31.

Therefore, the light from the subject transmits through the display unit 30 including the transparent display device 31 and is incident to the camera element 40. As a result, it is possible to obtain a captured output image signal from the camera element 40.

Here, while the camera element 40 is provided on the back surface of the transparent display device 31, since the display unit 30 is transparent, if the camera element is used as is, the camera element 40 may be recognized and visually noticed by a user who looks at the display screen 30D. In this regard, the present embodiment provides a method of preventing the camera element 40 provided on the back surface of the transparent display device 31 from being visually noticed.

That is, in the present embodiment, the print layer 34 is provided on the back surface of the transparent display device 31 except for the portion facing the surface of the camera element 40 (at least the incident surface having a lens). The camera element 40 provided on the back surface of the transparent display device 31 is visually obscured by the print layer 34.

In this case, the print layer 34 is formed to have the same optical reflection properties as that of the surface of the camera element 40 facing the back surface of the transparent display device 31. For example, in a case where the surface of the camera element 40 facing the back surface of the transparent display device 31 looks black, the print layer 34 becomes a black print layer. In addition, it would be preferable if the print layer has the same gloss as that of the lens of the surface of the camera element 40 facing the back surface of the transparent display device 31. Furthermore, as a material of the print layer 34, anything can be employed if it has the same optical reflection properties as that of the surface of the camera element 40 facing the back surface of the transparent display device 31.

On the substrate 50, the camera element 40 is mounted, and simultaneously, electronic components for operating the transparent display device 31, the camera element 40, and the like and electronic components for operating various functions of the mobile phone terminal 20 are mounted.

As described above, in the mobile phone terminal 20 according to the present embodiment, the display unit 30 includes the transparent display device 31, and the camera element 40 is provided on the back surface of the transparent display device 31. Therefore, the camera element 40 can receive the light from the subject that transmits through the display unit 30 and output the captured image.

In the present embodiment, the camera element 40 is provided in the area of the display screen 30D of the display unit 30. Therefore, it is possible to address the problems of the related art described above by using the image of a user captured by the camera element 40 as the transmission image for the video phone.

Figure 3A:
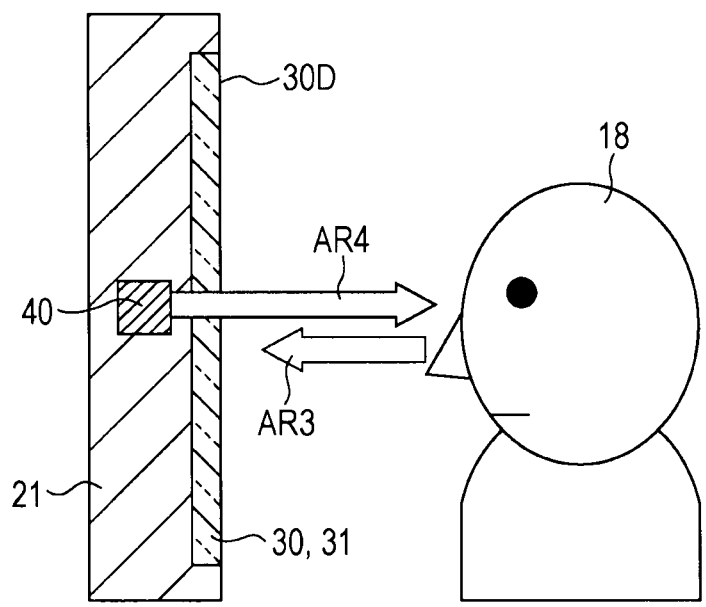
FIGS. 3A and 3B are diagrams describing the effects of the electronic apparatus according to a first embodiment of the disclosure.
Figure 3B:
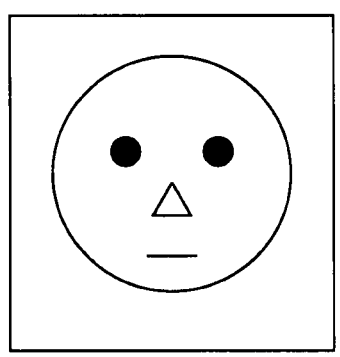

FIG. 3A illustrates a positional relationship among the display screen 30D of the display unit 30, the camera element 40, and a user 1 in the case of the video phone of the mobile phone terminal 20 according to the present embodiment. In addition, FIG. 3B illustrates the captured image of a user 1 using the camera element 40 based on this positional relationship.

In the mobile phone terminal 20 according to the present embodiment, a user performs communication using the video phone by activating the video phone function while looking at the display screen 30D from the direction of the arrow AR3. In this case, the image of a user captured using the camera element 40 is sent to the counterpart.

Therefore, as shown in FIG. 3A, the gaze direction of a user 1 is directed along the arrow AR3 to face the camera element 40 on the back surface of the display screen 30D. In other words, the gaze direction of a user 1 is on the same line as the camera shot direction of the camera element 40 indicated by the arrow AR4 of FIG. 3A, but their directions are opposite to each other. Therefore, the image captured by the camera element 40 becomes the front image in which the gaze direction is directed to the counterpart as shown in FIG. 3B. As a result, it is possible to address the problem that a sense of unease being given to the user in a video phone of the related art described above.

In addition, since the camera element 40 is provided in the area of the display screen 30D of the display unit 30, it is unnecessary to the an area of the camera element in an area separate from the display screen 30D, and there is an effect that it is possible to increase the size of the display screen 30D that much.

However, since the camera element 40 receives the incident light through the display unit 30, in the case where the incident light of the camera element 40 is influenced by the existence of the display unit 30, it is necessary to remove such an influence.

On the other hand, there are a single-sided light emission type and a dual-sided light emission type in the transparent organic EL panel used as the transparent display device 31 according to the present embodiment. In the single-sided emission type transparent organic EL panel, the electrode located in the back surface of the transparent display device 31 is made of for example, a metal such as aluminum, and the luminescent light from the hole-injection layer/organic electroluminescent layer (EL layer) is output only to the surface side.

Meanwhile, in the dual-sided emission type transparent organic EL panel, both two-layered electrodes interposing the hole-injection layer/organic electroluminescent layer (EL layer) include a transparent electrode made of, for example, indium tin oxide (ITO). For this reason, in the dual-sided emission type transparent organic EL panel, the luminescent light from the hole-injection layer/organic electroluminescent layer (EL layer) is output to the back surface side as well as the front surface side.

For this reason, in a case where the single-sided emission type transparent organic EL panel is used as the transparent display device 31, it is regarded that there is almost no incidence of the luminescent light from the corresponding transparent organic EL panel to the camera element 40 provided in the back surface side. Therefore, since the camera element 40 is not influenced by the display image of the transparent display device 31 of the display unit 30, it is optimal to use the single-sided emission type transparent organic EL panel as the transparent display device 31. However, in the case where the single-sided emission type transparent organic EL panel is used as the transparent display device 31, the light quantity transmitting to the back surface side of the transparent display device 31, that is, the light quantity incident to the camera element 40 is reduced.

On the contrary, in the case where the dual-sided emission type transparent organic EL panel is used, reduction of the light quantity transmitting to the back surface side of the transparent display device 31 is negligible. However, in the case of the dual-sided emission type transparent organic EL panel, the luminescent light from the hole-injection layer/organic electroluminescent layer (EL layer) is also incident to the camera element 40 provided in the back surface side. For this reason, the incident light of the camera element 40 is influenced by the color image displayed on the display unit 30.

In the present embodiment, in order not to reduce the incident light to the camera element 40 as much as possible, the dual-sided emission type transparent organic EL panel is used as the transparent display device 31. In addition, correction for removing the influence of the color image displayed on the display unit 30 is performed for the output capturing image data of the camera element 40.

FIG. 4 is a block diagram illustrating an exemplary structure of the hard disc of the internal electronic circuit of the mobile phone terminal 20 according to the present embodiment. In the mobile phone terminal 20 according to the present embodiment, a host control unit 111 including a microcomputer, the main memory 112, and the buffer memory 113 are connected to the system bus including the control bus 101 and the data bus 102. In addition, the communication circuit 114, the display controller 115, the manipulation unit 116, the camera control unit 117, and the camera color correction control unit 118 are connected to the system bus.

The microcomputer of the host control unit 111 stores a software program for controlling various processes of the mobile phone terminal according to the present embodiment. The host control unit 111 executes various control processes based on such a software program.

The main memory 112 stores, for example, data such as phone book data or mail addresses of the mobile phone terminal 20, or a uniform resource locator (URL) of the counterpart who accesses through the Internet. In addition, the main memory 112 may store the image data captured using the camera element 40. Furthermore, the main memory 112 stores accumulation data (including an application program) created by the functions provided in the mobile phone terminal 20.

The buffer memory 113 is used as a work area when the host control unit 111 executes the processes based on the software program.

The telephone communication circuit 114 is a radio communication unit for the mobile phone communication to execute telephone communication or other information communication (including communication via the Internet) via a base station and a mobile phone network and receives/transmits communication data through the antenna 114AT.

A speaker 22 functioning as a receiver and a microphone 23 functioning as a transmitter are connected to the data bus 102. Under control of the host control unit 111, the call voice from the counterpart, received by the telephone communication circuit 114, is emitted from the speaker 22, and the transmitted voice received by the microphone 23 is transmitted to the counterpart through the telephone communication circuit 114. In the present embodiment, the telephone communication circuit 114 also transmits/receives the image data of the image captured by the camera element 40 in the case of the video phone.

In this example, the transparent display device 31 is connected to the display controller 115. The transparent display device 31 displays various images under control of the host control unit 111 and simultaneously displays the image of the counterpart transmitted from the counterpart in the case of the video phone.

The manipulation unit 116 includes a numeric key pad, an up-down-left-right key set for selecting menu, and other keys. The host control unit 111 is configured to detect what kind of key is pressed using the manipulation unit 116 and execute the control process operation corresponding to the manipulated key.

In addition, the camera element 40 is connected to the camera control unit 117. In addition, when the camera capture function or the video phone function is activated using the manipulation unit 116, the captured image data from the camera element 40 are received by the data bus 102 through the camera control unit 118.

The camera color correction control unit 118 receives the captured image data read by the camera control unit 118 from the camera element 40 via the data bus 102 and performs color correction under control of the host control unit 111. The camera color correction control unit 118 may be configured to execute the control process under control of the host control unit 111 as a configuration including the microcomputer.

In addition, the camera color correction control unit 118 may be configured as a software function executed by the host control unit 111 based on the software program.

Figure 5:
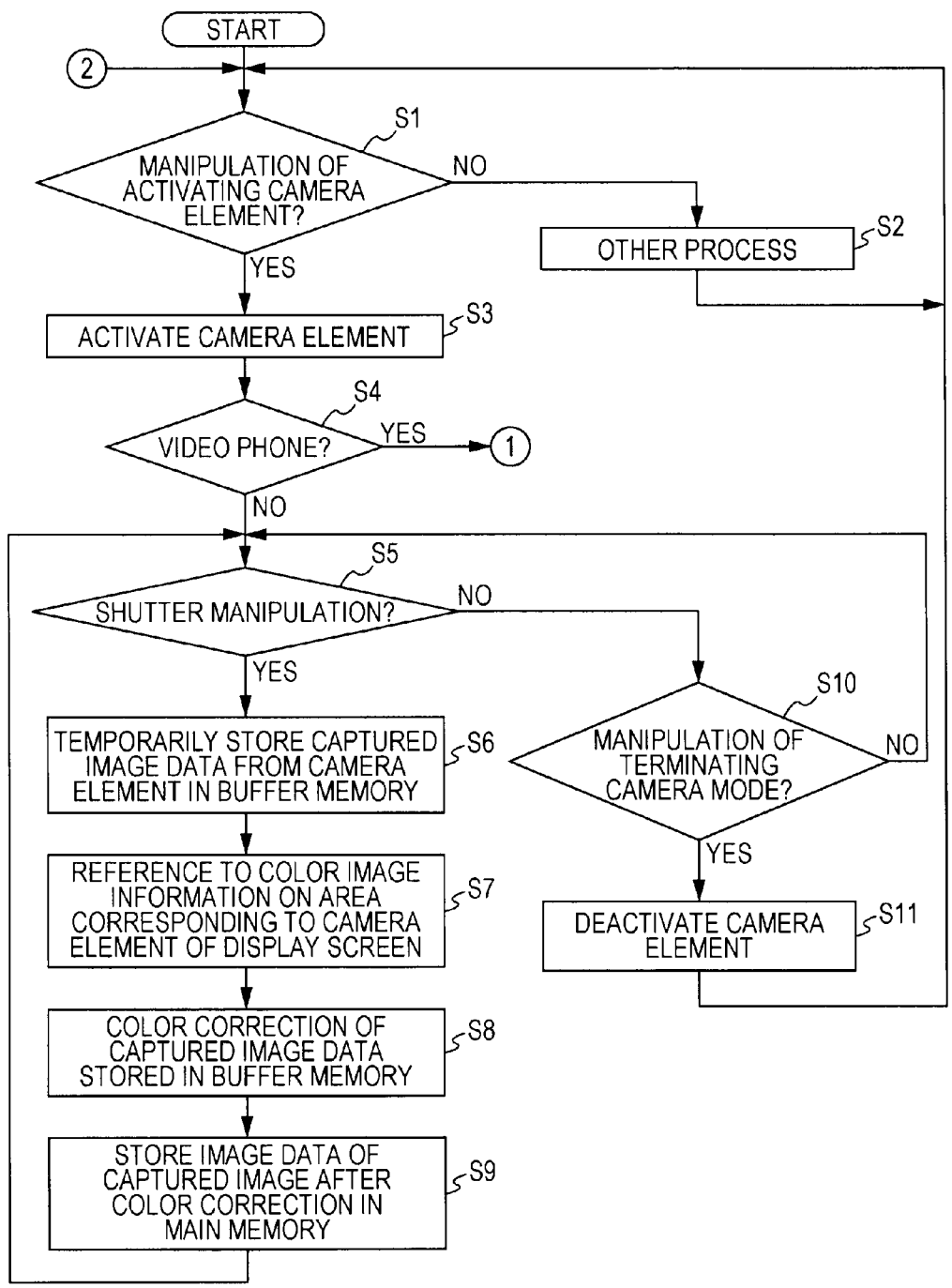
FIG. 5 is a partial flowchart illustrating an exemplary processing operation of the electronic apparatus according to a first embodiment of the disclosure.
Figure 6:
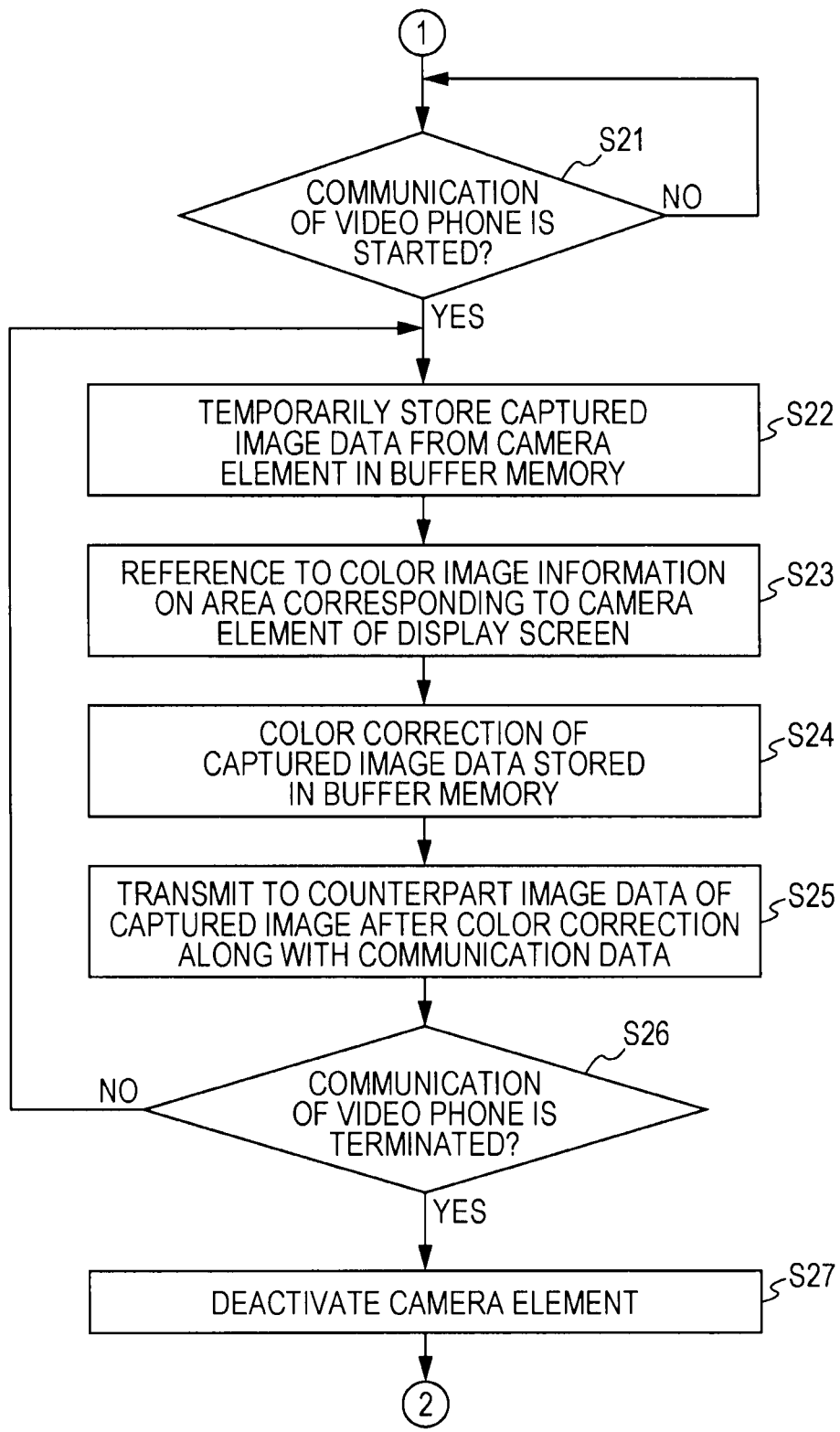
FIG. 6 is a partial flowchart for describing an exemplary processing operation of the electronic apparatus according to a first embodiment of the disclosure.

FIGS. 5 and 6 are flowcharts illustrating an exemplary flow of the color correction process for the captured image data from the camera element 40. The processes of each step of the flowcharts of FIGS. 5 and 6 are executed by the host control unit 111 and the camera color correction control unit 118.

The host control unit 111 monitors the manipulation input from the manipulation unit 116 and determines whether or not the manipulation for activating the camera element 40 is made (step S1). As described above, the manipulation for activating the camera element 40 includes manipulation for operating the video phone and the camera shot using the corresponding camera element 40. In this case, while the camera shot may include a still image shot mode and a moving picture shot mode, descriptions thereof are simple, and thus, the following description is based on only the still image shot mode.

In step S1, if it is determined that the manipulation for activating the camera element 40 is not made, the process routine of the host control unit 111 advances to other processes (step S2). Then, after completing the process of the step S2, the process routine of the host control unit 111 is returned to the step S1, and the processes after the step S1 are repeated.

If it is determined that the manipulation for activating the camera element 40 is made in the step S1, the host control unit 111 controls the camera control unit 117 to activate the camera element 40 (step S3).

Subsequently, the host control unit 111 determines whether or not the manipulation for activating the camera element 40 is the activation manipulation of the video phone mode (step S4). In the step S4, if it is determined that it is not the activation manipulation of the video phone mode, the host control unit 111 determines that manipulation for activating the camera element 40 is the camera shot mode, and it is determined whether or not a shutter manipulation is made using the manipulation unit 116 (step S5).

In the step S5, if it is determined that the shutter manipulation is made, the host control unit 111 controls the camera control unit 117 to temporarily store the captured image data from the camera element 40 in the buffer memory 113 (step S6).

Subsequently, the host control unit 111 transmits the color image information portion for creating the color image displayed on the display area corresponding to the camera element 40 out of the entire display area of the display screen 30D to the camera color correction control unit 118, where the color image information portion is referenced (step S7). Here, it is preferable that the display area corresponding to the referenced color image information portion is selected considering the incident light from the inclined direction as well as the incident light from the direction along the optical axis of the lens of the camera element 40. For this reason, the display area corresponding to the referenced color image information portion is centered at the corresponding position directly over the center of the lens of the camera element 40 and has a larger area than the size of the lens considering the light incidence from the inclined direction.

In addition, host control unit 111 controls the camera color correction control unit 118 to execute color correction based on the referenced color image information portion for the captured image data stored in the buffer memory 113 (step S8).

That is, in the transparent display device 31, since the hole-injection layer/organic electroluminescent layer (EL layer) emits light to create the color image based on the referenced color image information portion, the emitted light is also incident to the camera element 40. Therefore, the captured image from the camera element 40 is colored by the luminescent light from the corresponding referenced color image information portion. In this regard, the camera color correction control unit 118 performs color correction for the captured image data stored in the buffer memory 113 to remove the color caused by the luminescent light from the reference color image information portion of the transparent display device 31.

The camera color correction control unit 118 is adapted to store the captured image data after the color correction in the main memory 12 (step S8). As a result, the color image data of the still image at the time point when the shutter is manipulated are stored in the main memory 12. After the step S8, the process returns to the step S1, and the processes subsequent to the step S1 are repeated.

In step S5, if it is determined that the shutter is not manipulated, the host control unit 111 determines whether or not manipulation of terminating the camera shot mode has been made (step S10). Then, in step S10, if it is determined that the manipulation of termination has not been made, the host control unit 111 returns the process to the step S5 and repeats the processes subsequent to the step S5.

In step S10, if it is determined that the manipulation of terminating the camera shot mode has been made, the host control unit 111 controls the camera control unit 117 to stop the operation of the camera element 40 (step S11). Then, the host control unit 111 returns the process to the step S1 and repeats the processes subsequent to the step S1.

In step S4, if it is determined that the manipulation of activating the video phone mode has been made, the host control unit 111 waits until the video phone has a communication state (step S21 in FIG. 6). In step S21, if it is determined that the video phone has a communication state, the host control unit 111 controls the camera control unit 117 to temporarily store the captured image data from the camera element 40 in the buffer memory 113 (step S22).

Then, the host control unit 111 transmits the color image information portion used to create the color image displayed in the display area corresponding to the camera element 40 out of the entire display area of the display screen 30D to the camera color correction control unit 118, where the color image information portion is referenced (step S23). Similar to the step S8, the host control unit 111 controls the camera color correction control unit 118 to perform color correction based on the referenced color image information portion for the captured image data stored in the buffer memory 113 (step S24).

In addition, the camera color correction control unit 118 transmits the captured image data subjected to the color correction to the telephone communication circuit 114. The telephone communication circuit 114 converts the received captured image data into transmission data along with the voice data received through the microphone 23 and transmits the data to the counterpart (step S25).

Then, the host control unit 111 determines whether or not the manipulation of terminating video phone communication has been made (step S26). If it is determined that the manipulation of terminating communication has not been made, the process returns to the step S22, and the processes subsequent to the step S22 are repeated.

In step S26, if it is determined that the manipulation of terminating video phone communication has been made, the host control unit 111 controls the camera control unit 117 to stop the operation of the camera element 40 (step S27). Then, the host control unit 111 returns the process to the step S1 and repeats the processes subsequent to the step S1.

As described above, in the present embodiment, the camera element 40 is provided on the back surface of the transparent display device 31. For this reason, if the color image is displayed in the corresponding transparent display device 31, the color pickup image from the camera element 40 may be colored by such a captured color image. However, in the present embodiment, as described above, color correction is applied to the captured color image from the camera element 40 based on the display image of the transparent display device 31. Therefore, it is possible to reduce or remove coloring of the captured image.

In addition, since the display image of the transparent display device 31 is a color image in the aforementioned description, coloring correction based on the corresponding color display image is performed for the captured image data from the camera element 40. However, even in the case where the display image of the transparent display device 31 is a monochrome image, the correction of the captured image data from the camera element 40 may be performed based on the display image data.

In other words, in a case where the display image of the transparent display device 31 is a monochrome image, the captured image data obtained from the camera element 40 have light and shade depending on the display image. In this regard, the luminance correction may be performed for the captured image data from the camera element 40 based on the monochrome display image data thereof. That is, a configuration for correcting the gain of the captured image data from the camera element 40 based on the light transmission amount at the display screen position corresponding to the light incident position to the camera element 40 may be provided.

Modified Example of First Embodiment

In addition, the disclosure is not limited to the configuration in which the print layer is provided on the back surface of the transparent display device 31 as a way for visually obscuring the camera element 40 by way of an example of a sensor on the back surface of the transparent display device 31. For example, the same print layer may be provided on the surface of the substrate 50 where the camera element 40 is provided (the surface facing the back surface of the transparent display device 31) without providing the print layer 34 on the back surface of the transparent display device 31.

In addition, instead of the print layer 34, a sheet having the same optical reflection properties as that of the print layer 34 may be arranged on the back surface of the display screen of the transparent display device 31.

In addition, the entire surface of the substrate 50 (including the camera element 40) where the camera element 40 is provided may be covered by a color shade film having an optical transmittance of, for example, 40% to 60%.

In addition, the substrate 50 is not necessarily provided on the back surface of the display screen 30D of the display unit 30, but the camera element 40 or the display unit 30 may be electrically connected to the substrate provided in a portion other than the back surface of the display screen 30D of the display unit 30 through a lead portion including a flexible substrate. In this case, the same print layer as the print layer 34 may be provided on the internal wall surface of the casing 21 without providing the print layer 34 on the back surface of the transparent display device 31.

In addition, while a single camera element 40 is provided on the back surface of the transparent display device 31 in the aforementioned embodiment, the number of the camera elements provided on the back surface of the transparent display device 31 may be plural in the present disclosure. For example, double camera elements for left and right eyes may be provided to obtain a 3D image as the captured image.

In addition, while the manipulation unit is configured to provide a manipulation button group in a separate area from the display screen 30D in the aforementioned embodiment, the manipulation unit may be configured by providing a transparent touch panel on the surface of the display screen 30D and arranging button icons on the display screen 30D.

In addition, as described above, in a case where a single-sided emission type transparent organic EL panel is used as the transparent display device 31, the aforementioned camera color correction control unit 118 may be omitted. However, in this case, considering the decay amount of the incident light in the single-sided emission type transparent organic EL panel, it would be preferable to perform correction to increase the incident light sensitivity of the camera element 40 or the gain of the captured image data from the camera element.

The aforementioned embodiment relates to a mobile phone terminal. The display screen 30D is made to usually display any sort of image while the power supply is applied. Therefore, as described above, when the image is captured using the camera element 40, it is necessary to correct the captured image data output therefrom based on the display image. However, it is needless to say that, in the case of an electronic apparatus capable of turning on or off image display on the display unit 30, the display unit 30 has a transparent state by turning off image display on the display unit 30 when the camera element 40 is operated, so that the aforementioned correction becomes unnecessary.

Second Embodiment

In the aforementioned first embodiment, the camera element is exemplarily arranged as a sensor on the back surface of the display screen. On the contrary, in the second embodiment, an illuminance sensor and a proximity sensor are provided as the sensor.

Figure 7:
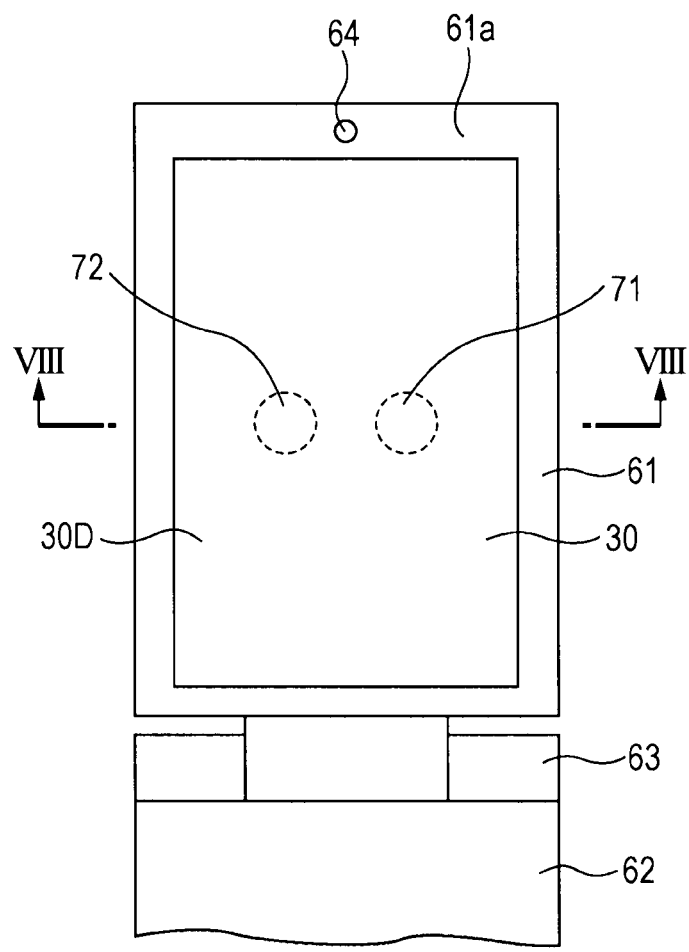
FIG. 7 is a diagram illustrating an exemplary appearance of the electronic apparatus according to a second embodiment of the disclosure.
Figure 8:
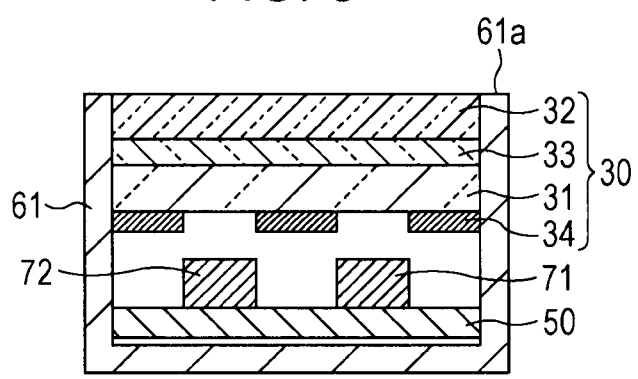
FIG. 8 is a cross-sectional view along the line VIII-VIII of FIG. 7.
Figure 14A:
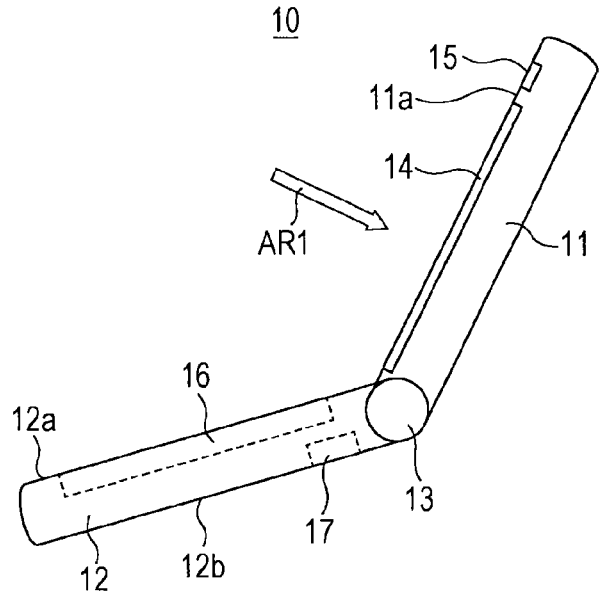
FIG. 14 is a diagram for describing an exemplary electronic apparatus of the related art.
Figure 14B:
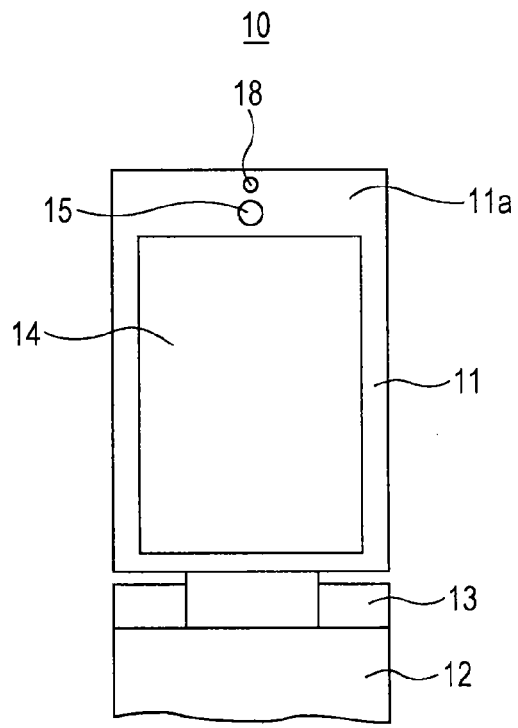
Figure 15A:
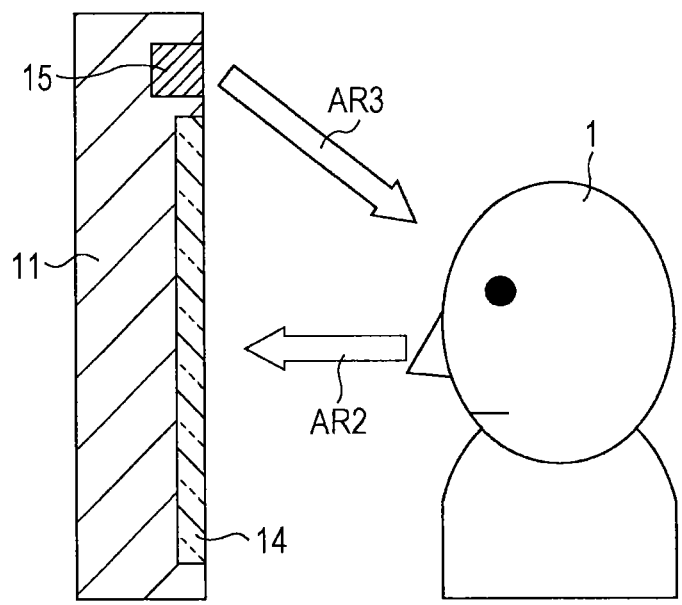
FIG. 15 is a diagram for describing problems of the electronic apparatus of the related art.
Figure 15B:
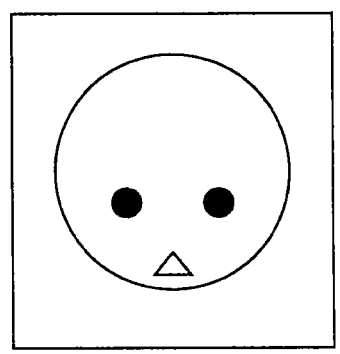
Figure 16:
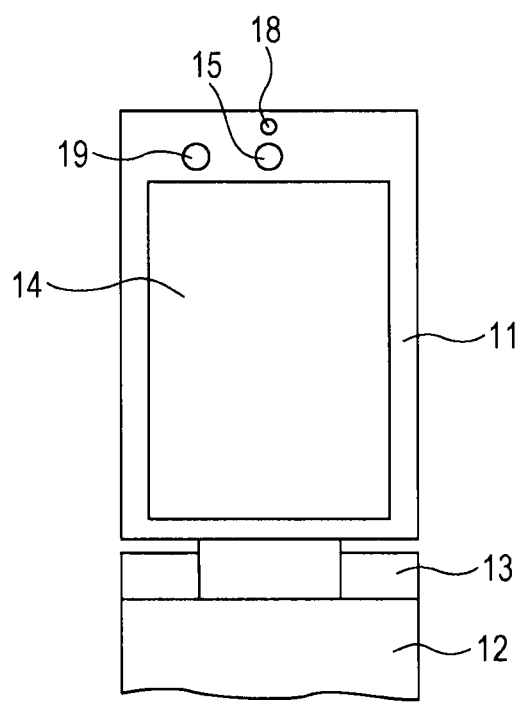
FIG. 16 is a diagram for describing another exemplary electronic apparatus of the related art.
Figure 17:
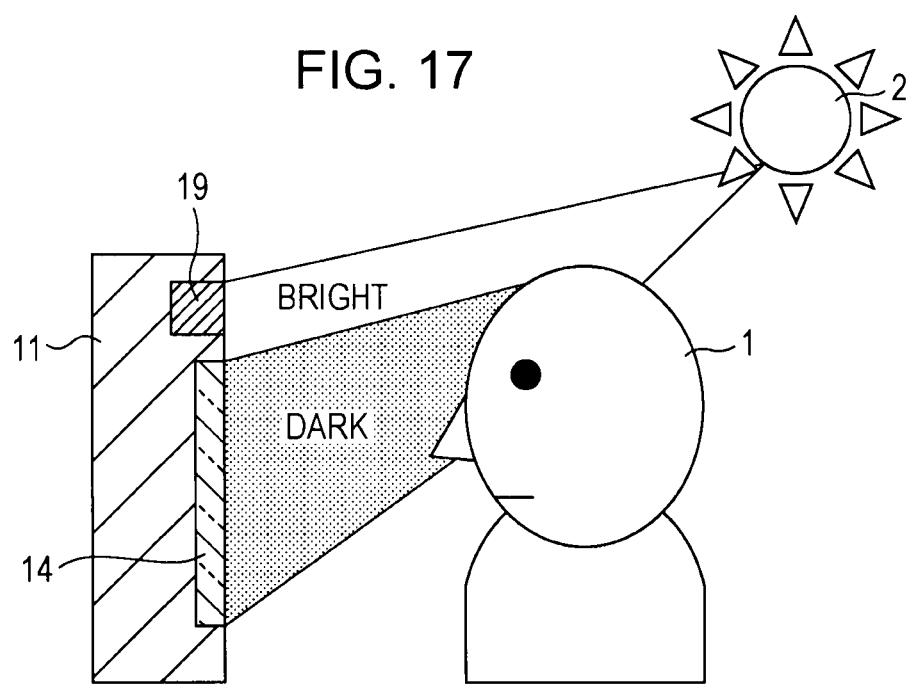
FIG. 17 is a diagram for describing problems of the electronic apparatus of the related art.

FIG. 7 is a diagram for describing an exemplary appearance of an electronic apparatus according to the second embodiment, in which a foldable mobile phone terminal 60 is exemplified. In the foldable mobile phone terminal 60 in this example, the upper casing 61 and the lower casing 62 are openably assembled about the rotation hinge 63 of the rotation hinge portion 63. In FIG. 7, the foldable mobile phone terminal 60 is opened at a predetermined angle, and the internal face 61a of the upper casing 61 is shown from a perpendicular direction therefrom. FIG. 7 corresponds to FIG. 14B which shows a foldable mobile phone terminal of the related art. FIG. 8 is a cross-sectional view taken along the line VIII-VIII for illustrating the mobile phone terminal 60 of FIG. 7.

In the mobile phone terminal 60 of this example, the internal face 61a of the upper casing 61 includes a display unit having the same structure as that of the display unit 30 of the first embodiment. Since the display unit of the mobile phone terminal 60 of the second embodiment is similar to the display unit 30 of the first embodiment, like reference numerals denote like elements for convenience of description.

Specifically, in the mobile phone terminal 60 of the second embodiment, the display unit 30 is provided on the internal face 61a of the upper casing 61. In addition, in the second embodiment, the illuminance sensor 71 and the proximity sensor 72 are provided for correcting the luminance of the display screen 30D on the back surface of the display screen 30D of the display unit 30.

In addition, the speaker 64 for emitting a received voice during a call is provided near the upper end in the area separate from the display screen 30D of the internal face 61a of the upper casing 61.

Similar to the first embodiment, in the second embodiment, the print layer 34 is provided to visually obscure two sensors 71 and 72 provided on the back surface of the transparent display device 31 as shown in FIG. 8.

In the second embodiment, the print layer 34 is provided on the back surface of the transparent display device 31 except for the portions opposite to the surfaces of the sensors 71 and 72. This print layer 34 visually obscures the two sensors 71 and 72 provided on the back surface of the transparent display device 31.

The print layer 34 is formed to have the same optical reflection properties as those of the surfaces of the two sensors 71 and 72 facing the back surface of the transparent display device 31. For example, when the surfaces of the sensors 71 and 72 facing the back surface of the transparent display device 31 look black, the print layer 34 has a black color. In addition, when the surfaces of the sensors 71 and 72 facing the back surface of the transparent display device 31 have gloss, the print layer may have the same gloss. In addition, any material can be employed as a material of the print layer 34 if it has the same optical reflection properties as those of the sensors 71 and 72 facing the back surface of the transparent display device 31.

In addition, the mobile phone terminal 60 has the same internal circuit hardware configuration as that of the mobile phone terminal 20 of the first embodiment shown in FIG. 4, and the sensors 71 and 72 are connected to the system bus through the interface thereof instead of the camera element 40.

As described above, the host control unit of the mobile phone terminal 60 adjusts the luminance of the display screen 30D in response to the illuminance detected by the illuminance sensor 71 so as to make a user see it easily. For example, when the illuminance detected by the illuminance sensor 71 is low, and the environment used by the display screen 30D is relatively dark, the luminance of the display screen 30D is made to be relatively dark. In addition, when the illuminance detected by the illuminance sensor 71 is high, and the environment used by the display screen 30D is bright, the luminance of the display screen 30D is made to be bright.

In this case, in the case where the color image is displayed on the display screen 30D, and the incident light quantity to the illuminance sensor 71 changes depending on the corresponding display image, it would be more preferable that correction depending on the changed light quantity is made for the illuminance detection output of the corresponding illuminance sensor 71.

In this manner, according to the second embodiment, since the illuminance sensor 71 is provided in the area overlapping with the display area of the corresponding display screen 30D on the back surface of the display screen 30D, it is possible to avoid the problems of the related art described above.

Figure 9:
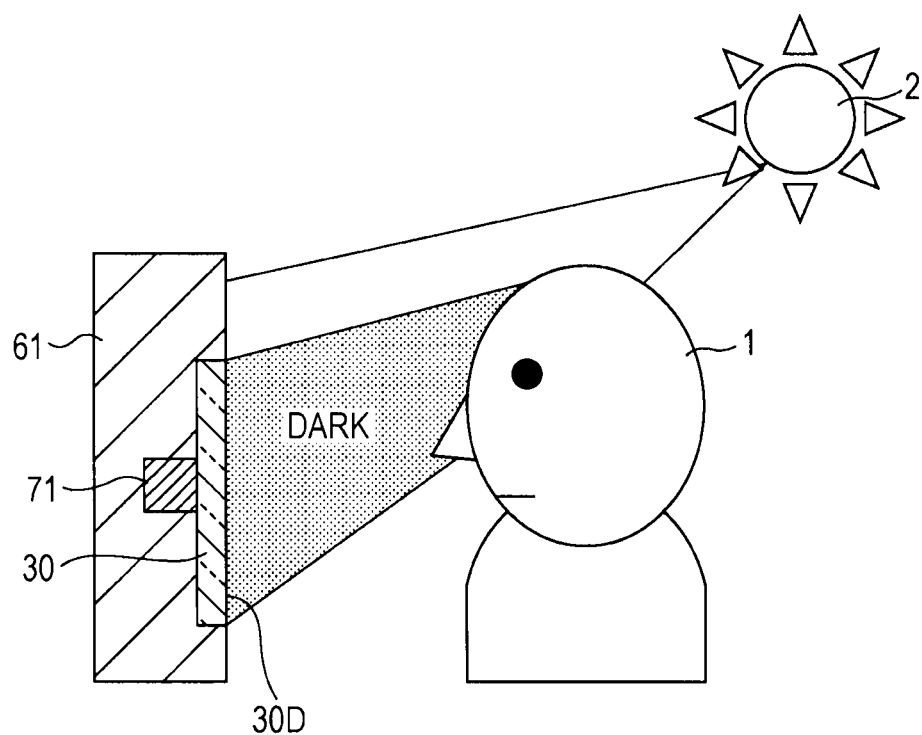
FIG. 9 is a diagram used for describing effects of the electronic apparatus according to a second embodiment of the disclosure.

For example, a relationship among the sun 2, the display screen 30D, the illuminance sensor 71, and the user 1 when the mobile phone terminal 60 is used in an outdoor environment is illustrated in FIG. 9. In the relationship between the sun 2 and the user 1 as shown in the example of FIG. 9, the display screen 30D is shaded by the shadow of the user 1. However, in the second embodiment, the illuminance sensor 71 is also shaded by the shadow of the user 1. Therefore, the illuminance detected by the illuminance sensor 71 is equal to that of the display screen 30D, and the luminance of the display screen 30D becomes optimal for the user 1 by adjusting the luminance of the display screen 30D based on the illuminance detected by the illuminance sensor 71.

In this example, the proximity sensor 72 is configured of an infrared ray type proximity sensor and detects the approach of a user's face to the display screen 30D during a call and the approach of the lower casing 62 to the display screen 30D when the mobile phone terminal 60 is folded.

In other words, the proximity sensor 72 includes an infrared ray luminescent element and an optical detector so that the infrared rays emitted from the infrared ray luminescent element, and reflected by and returned from the detection target are received by the optical detector. The electric power corresponding to the distance between the proximity sensor 72 and the detection target is output from the optical detector. The host control unit of the mobile phone terminal 60 determines that the detection target approaches within a certain distance when the output electric power from the optical detector of the proximity sensor 72 is equal to or larger than a predetermined value.

The host control unit of the mobile phone terminal 60 controls the display unit 30 to be turned off when it is determined that the detection target approaches within a certain distance based on the output from the proximity sensor 72. When the display unit 30 has a touch panel function, the touch panel is also controlled to be turned off.

Therefore, the host control unit of the mobile phone terminal 60 turns off the display unit 30 to stop display on the display screen 30D when it is detected that the mobile phone terminal 60 is closed in a folded state based on the output from the proximity sensor 72. When it is detected that the mobile phone terminal 60 is opened, the host control unit turns on the display unit 30 to start display on the display screen 30D.

In addition, the host control unit of the mobile phone terminal 60 turns off the display unit 30 when it is detected that a user's face approaches the display unit 30 to try making a call based on the output from the proximity sensor 72 to stop display on the display screen 30D. In addition, as the call is terminated, and a user's face recedes from the display unit 30, the host control unit of the mobile phone terminal 60 detects it based on the output of the proximity sensor 72, and turns on the display unit 30 to restart display on the display screen 30D.

While the proximity sensor 72 is also provided in the area separate from the display screen 30D on the same surface as that of the display screen 30D in the related art, the proximity sensor 72 may be provided on the back surface of the display screen 30D along with the illuminance sensor 71 according to the second embodiment. Therefore, it is possible to save the space for those sensors 71 and 72, and it is possible to accordingly increase the size of the display screen 30D.

The modified example of the first embodiment described above may be applied to the second embodiment as a way of visually obscuring the sensors 71 and 72 provided on the back surface of the transparent display device 31. In addition, other modified examples described in the first embodiment may be similarly applied to the second embodiment.

While the illuminance sensor 71 and the proximity sensor 72 are provided on the back surface of the display screen 30D in the second embodiment described above, the camera element 40 described in the first embodiment may be additionally provided on the back surface of the display screen 30D. In addition, any other types may be used as the proximity sensor 72 without limitation to the infrared ray type.

Furthermore, the second embodiment is not limited to the foldable mobile phone terminal, but may be applied to a so-called straight type mobile phone terminal.

Third Embodiment

The third embodiment describes an example that a predetermined input manipulation is reliably detected using a sensor by displaying a guide indication for a predetermined input manipulation from a user on the display screen using the sensor provided on the back surface of the display screen, for example, in the case where the sensor detects a predetermined input manipulation from a user.

For example, in the case where a user's fingerprint is read by a fingerprint sensor, and fingerprint authentication of the corresponding user is executed, if an appropriate guide is not provided, a user who is not familiar with that may not know how to input the fingerprint.

The example of the third embodiment is made to allow even a user who is not familiar with the fingerprint authentication to readily execute an input manipulation for the fingerprint authentication in the mobile phone terminal capable of executing the fingerprint authentication.

Figure 10:
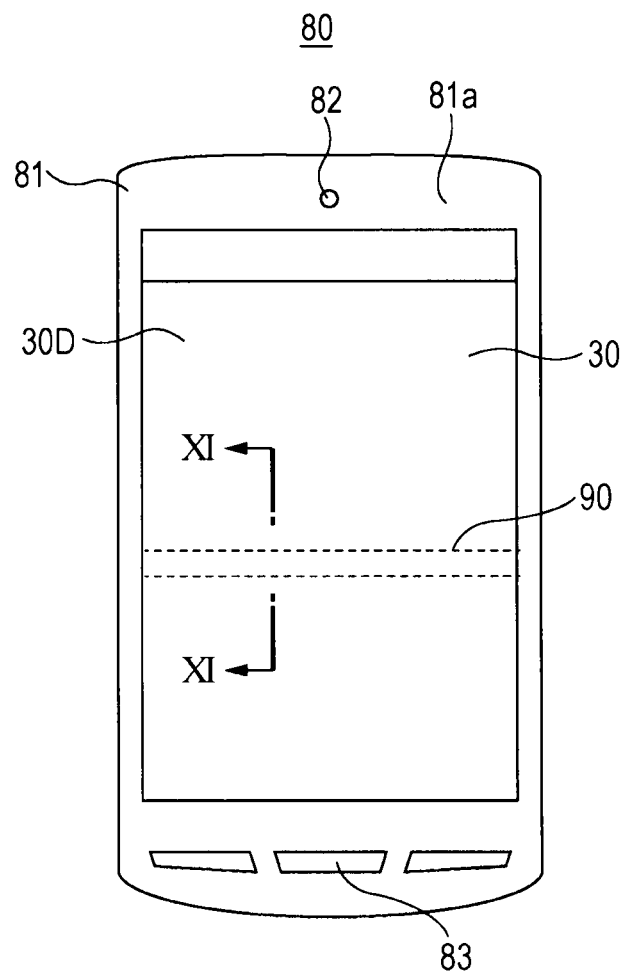
FIG. 10 is a diagram illustrating an exemplary appearance of the electronic apparatus according to a third embodiment of the disclosure.
Figure 11:
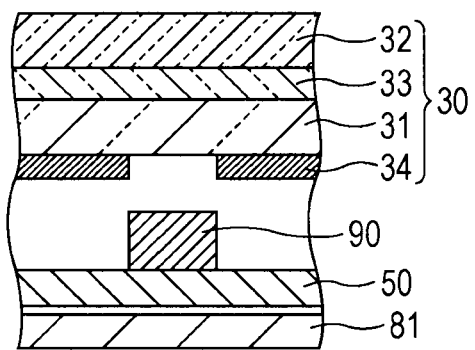
FIG. 11 is a cross-sectional view taken along the line XI-XI.

FIG. 10 illustrates appearance of the mobile phone terminal 80 as an example of the electronic apparatus according to the third embodiment. FIG. 11 is a cross-sectional view taken along the line XI-XI of FIG. 10.

The mobile phone terminal 80 of the example shown in FIG. 10 is a so-called straight type mobile phone terminal and includes a casing 81 having a thin rectangular shape. The mobile phone terminal 80 of this example includes the display screen 30D of the display unit 30 corresponding to an embodiment of the sensor-equipped display apparatus of the present disclosure on one plane 81a of the casing 81. Throughout both the display unit of the mobile phone terminal 60 of the second embodiment and the display unit 30 of the first embodiment, like reference numerals denote like elements for convenience of description.

Specifically, in the mobile phone terminal 80 according to the third embodiment, the display unit 30 is provided on one plane 81a of the casing 81. In the third embodiment, a fingerprint sensor 90 having a bar shape traversing across the display screen 30D is provided on the back surface of the display screen 30D of the display unit 30. Also, in the third embodiment, the print layer 34 similar to that of the first embodiment described above is provided as a way for visually obscuring the fingerprint sensor 90 provided on the back surface of the transparent display device 31.

A speaker 82 for emitting the received voice during a call is provided in the proximity of the upper end of the area separate from the display screen 30D of one plane 81a of the casing 81, and a microphone 83 for receiving transmitted voice during a call is provided in the proximity of the lower end.

In the third embodiment, the mobile phone terminal 80 has a fingerprint authentication function and includes a manipulation button for activating the corresponding fingerprint authentication function.

In addition, the mobile phone terminal 80 has the same internal circuit hardware configuration as that of the mobile phone terminal 20 of the first embodiment shown in FIG. 4, and the fingerprint sensor 90 is connected to the system bus through the interface thereof instead of the camera element 40.

Figure 12:
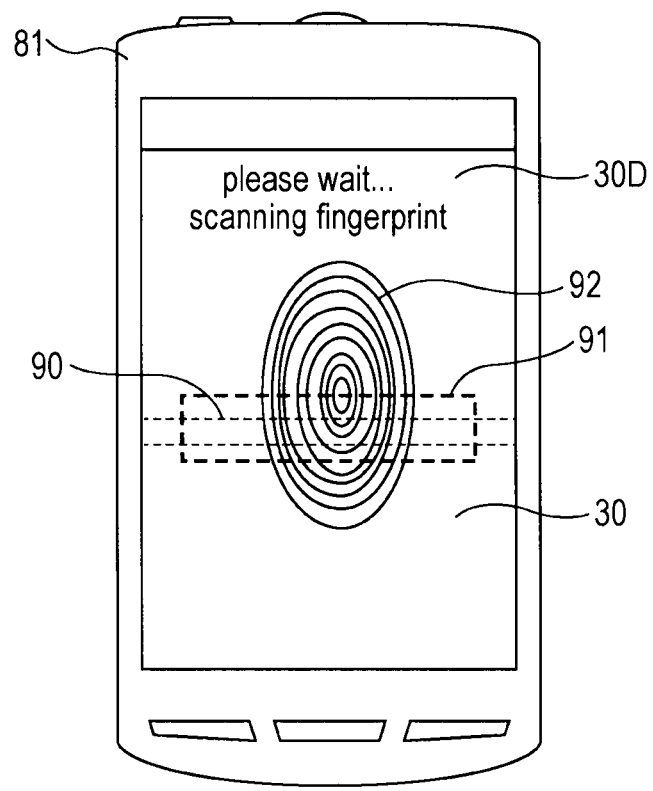
FIG. 12 is a diagram for describing main components of the electronic apparatus according to a third embodiment of the disclosure.

If the host control unit of the mobile phone terminal 80 detects that the fingerprint authentication function is activated by the manipulation input, the standby screen displayed on the display screen 30D until that time is converted into the fingerprint authentication screen. On the fingerprint authentication screen, a guide indication regarding how a user is to make the fingerprint sensor 90 read the fingerprint is displayed. An example of the fingerprint authentication screen is shown in FIG. 12.

On the fingerprint authentication screen, a first guide image 91 for notifying a user of the approximate position of the fingerprint sensor 90 and a second guide image 92 for notifying a user of the fingerprint input position are displayed.

Accordingly, a user may perform the fingerprint input manipulation based on the first and second guide images 91 and 92 displayed on the display screen 30D during the fingerprint authentication. As a result, the fingerprint sensor 90 can rapidly and reliably receive the fingerprint input, and it is possible to rapidly execute the fingerprint authentication.

Figure 13:
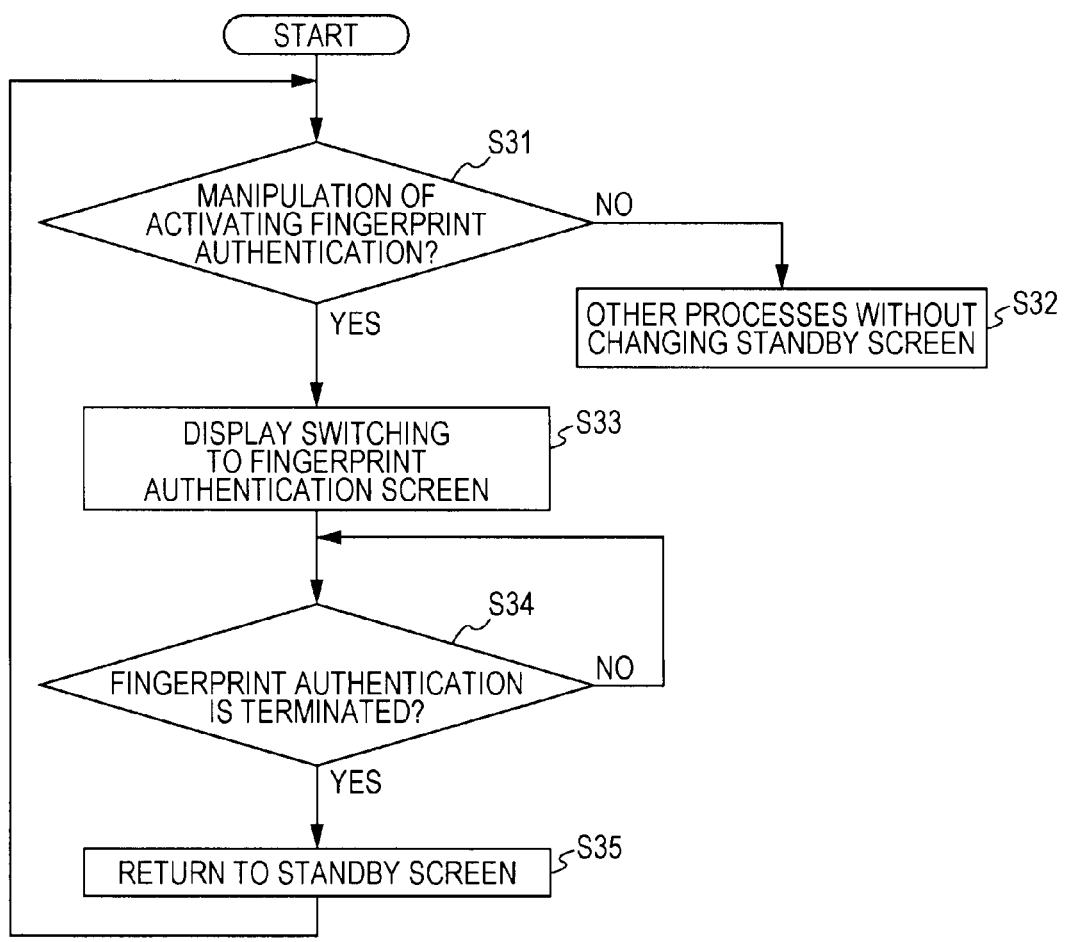
FIG. 13 is a flowchart illustrating an exemplary processing operation of the electronic apparatus according to a third embodiment of the disclosure.

An example of the flow of a process of switching the display screen on the display screen 30D when the fingerprint authentication function is activated according to the third embodiment will be described with reference to the flowchart of FIG. 13.

The host control unit of the mobile phone terminal 80 determines whether or not a manipulation of activating the fingerprint authentication function has been made (step S31). If it is determined that the activating manipulation has not been made, the standby screen is continuously displayed on the transparent display device 31 of the display unit 30, and other processes are executed (step S32).

If it is determined that the manipulation of activating the fingerprint authentication function has been made in the step S31, the host control unit displays the fingerprint authentication screen on the transparent display device 31 of the display unit 30 to switch from the standby screen that has been displayed until that time (step S33).

In addition, the host control unit determines whether or not the fingerprint authentication manipulation and processing have been terminated from a user (step S34). If it is determined that the fingerprint authentication manipulation and processing have been terminated, the display screen of the transparent display device 31 of the display unit 30 is switched from the fingerprint authentication screen to the standby screen (step S35). In addition, the host control unit returns the process to step S31 and repeats the processes subsequent to the step S31.

As described above, according to the third embodiment, the fingerprint sensor 90 is provided on the back side of the display unit 30 including the transparent display device 31, and at the same time, a guide image for the fingerprint input manipulation may be displayed on the transparent display device 31. Therefore, a user can readily adjust the position of a finger based on the guide image when the fingerprint is input so that the fingerprint authentication can be readily made.

In addition, while the first and second guide images 91 and 92 are still images in the aforementioned example, a user may be notified of the speed of moving the user's finger when the fingerprint is input by exchanging the second guide image with a moving picture matching the motion of when a fingerprint is input. In addition, a voice may be emitted from the speaker 82 according to the voice guide message.

While the third embodiment described above is an example of applying the present disclosure to the fingerprint authentication case, it is needless to say that the guide image displayed on the display screen 30D is changed by the application of the sensor provided on the back surface of the display screen 30D.

Other Embodiments or Modified Examples

While the mobile phone terminals of the aforementioned embodiments have a manipulation button as the manipulation input, a transparent touch panel may be provided on the display screen 30D, and an interface for indicating and manipulating the icon button displayed on the display screen 30D may be provided by the corresponding touch panel.

While the mobile phone terminal is exemplified as the electronic apparatus in the aforementioned embodiment, it is needless to say that the electronic apparatus of the present disclosure is not limited to the mobile phone terminal. The present disclosure may be applied to any electronic apparatus if the display screen and the sensor are provided on one surface of the casing.

While the transparent organic EL panel is used as the transparent display device in the aforementioned embodiment, the present disclosure is not limited thereto. For example, a transparent liquid crystal display (LCD) panel may be used as the transparent display device.

It should be understood by those skilled in the art that various modifications, combinations, sub-combinations and alterations may occur depending on design requirements and other factors insofar as they are within the scope of the appended claims or the equivalents thereof.

What is claimed is:

1. A mobile communication terminal comprising:
    a light-transmissive substrate;
    a sensor configured to detect light passing through the light-transmissive substrate;
    a material configured to visually obscure the sensor when viewed through the light-transmissive substrate, wherein the material has optical reflection properties similar to a top surface of the sensor opposing the light-transmissive substrate; and
    circuitry configured to control a communication function of the mobile communication terminal via a wireless network.

2. The mobile communication terminal of claim 1, further comprising:
    a bonding sheet attached to an upper surface of the light-transmissive substrate.

3. The mobile communication terminal of claim 2, wherein the bonding sheet is a transparent tape or transparent resin cured by ultraviolet rays.

4. The mobile communication terminal of claim 2, wherein the bonding sheet has a refractive index that is approximately the same as a refractive index of the light-transmissive substrate.

5. The mobile communication terminal of claim 1, further comprising:
    a substrate on which the sensor and electronic components configured to operate the light-transmissive substrate are mounted.

6. The mobile communication terminal of claim 5, wherein the material is provided on top surface of the substrate opposing a bottom surface of the light-transmissive substrate.

7. The mobile communication terminal of claim 6, wherein the material is configured to have an optical transmittance of 40% to 60%.

8. The mobile communication terminal of claim 1, wherein the light-transmissive substrate is a transparent organic electroluminescence panel.

9. The mobile communication terminal of claim 1, wherein the light-transmissive substrate is a single-sided emission type transparent organic electroluminescence panel.

10. The mobile communication terminal of claim 1, wherein the light-transmissive substrate is a dual-sided emission type transparent organic electroluminescence panel.

11. The mobile communication terminal of claim 1, wherein the material is provided on a bottom surface of the light-transmissive substrate except for on a portion of the light light-transmissive substrate opposing the sensor.

12. The mobile communication terminal of claim 1, wherein the sensor is a camera element configured to capture an image.

13. The mobile communication terminal of claim 1, wherein the circuitry is configured to perform image correction processing on data output from the sensor based on image data displayed on a position of the light-transmissive substrate opposing the sensor.

14. The mobile communication terminal of claim 1, wherein the circuitry is further configured to:
    determine that a fingerprint authentication function has been activated based on a user input received at a user interface of the mobile communication terminal;
    acquire image data corresponding to the user's fingerprint detected by the sensor; and
    perform fingerprint authentication based on the acquired image data.

15. An electronic apparatus, comprising:
    a light-transmissive substrate;
    a sensor configured to detect light passing through the light-transmissive substrate;
    a material configured to visually obscure the sensor when viewed through the light-transmissive substrate, wherein the material has optical reflection properties similar to a top surface of the sensor opposing the light-transmissive substrate; and
    circuitry configured to control a communication function of the electronic apparatus via a wireless network.

16. The electronic apparatus of claim 15, wherein the circuitry is further configured to:
    determine that a fingerprint authentication function has been activated based on a user input received at a user interface of the electronic apparatus;
    acquire image data corresponding to the user's fingerprint detected by the sensor; and
    perform fingerprint authentication based on the acquired image data.

* * * * *